(12) United States Patent
Lawson

(10) Patent No.: US 8,066,077 B2
(45) Date of Patent: Nov. 29, 2011

(54) ELECTRICAL SUBMERSIBLE PUMP AND GAS COMPRESSOR

(75) Inventor: Peter Francis Lawson, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 318 days.

(21) Appl. No.: 11/957,912

(22) Filed: Dec. 17, 2007

(65) Prior Publication Data
US 2009/0151928 A1 Jun. 18, 2009

(51) Int. Cl.
*E21B 43/00* (2006.01)

(52) U.S. Cl. ..................... 166/369; 166/105.5

(58) Field of Classification Search ............... 166/105.5, 166/369, 378, 66.4
See application file for complete search history.

(56) References Cited

U.S. PATENT DOCUMENTS

| | | | |
|---|---|---|---|
| 3,291,057 A | 12/1966 | Carle | |
| 4,913,630 A | 4/1990 | Cotherman et al. | |
| 5,207,810 A | 5/1993 | Sheth | |
| 5,605,193 A | 2/1997 | Bearden et al. | |
| 5,755,288 A | 5/1998 | Bearden et al. | |
| 5,988,275 A * | 11/1999 | Brady et al. | 166/105.5 |
| 6,113,675 A * | 9/2000 | Branstetter | 95/261 |
| 6,123,149 A | 9/2000 | McKinzie et al. | |
| 6,167,965 B1 | 1/2001 | Bearden et al. | |
| 6,260,626 B1 | 7/2001 | Rivas | |
| 6,533,039 B2 * | 3/2003 | Rivas et al. | 166/369 |
| 6,672,387 B2 | 1/2004 | Brady et al. | |
| 6,676,366 B2 | 1/2004 | Kao | |
| 6,691,781 B2 * | 2/2004 | Grant et al. | 166/265 |
| 7,275,599 B2 | 10/2007 | Wilde | |
| 7,445,429 B2 * | 11/2008 | Wilson et al. | 415/199.5 |
| 2006/0045757 A1 | 3/2006 | Parr | |
| 2009/0068037 A1 * | 3/2009 | Shaw et al. | 417/423.3 |
| 2011/0004352 A1 * | 1/2011 | Wilde et al. | 700/282 |

\* cited by examiner

*Primary Examiner* — David Bagnell
*Assistant Examiner* — Elizabeth Gottlieb
(74) *Attorney, Agent, or Firm* — Bracewell & Giuliani LLP

(57) ABSTRACT

A wellbore fluid production system that is disposable in a wellbore comprising a separator, a pump, a compressor, and a motor. The separator segregates the gas and liquid and delivers the gas to the compressor inlet and the liquid to the pump inlet. The pump pressurizes the liquid for delivery to the surface. The compressor pressurizes the gas for reinjection into the wellbore, injection into another subterranean formation, or for delivery to the surface.

13 Claims, 4 Drawing Sheets

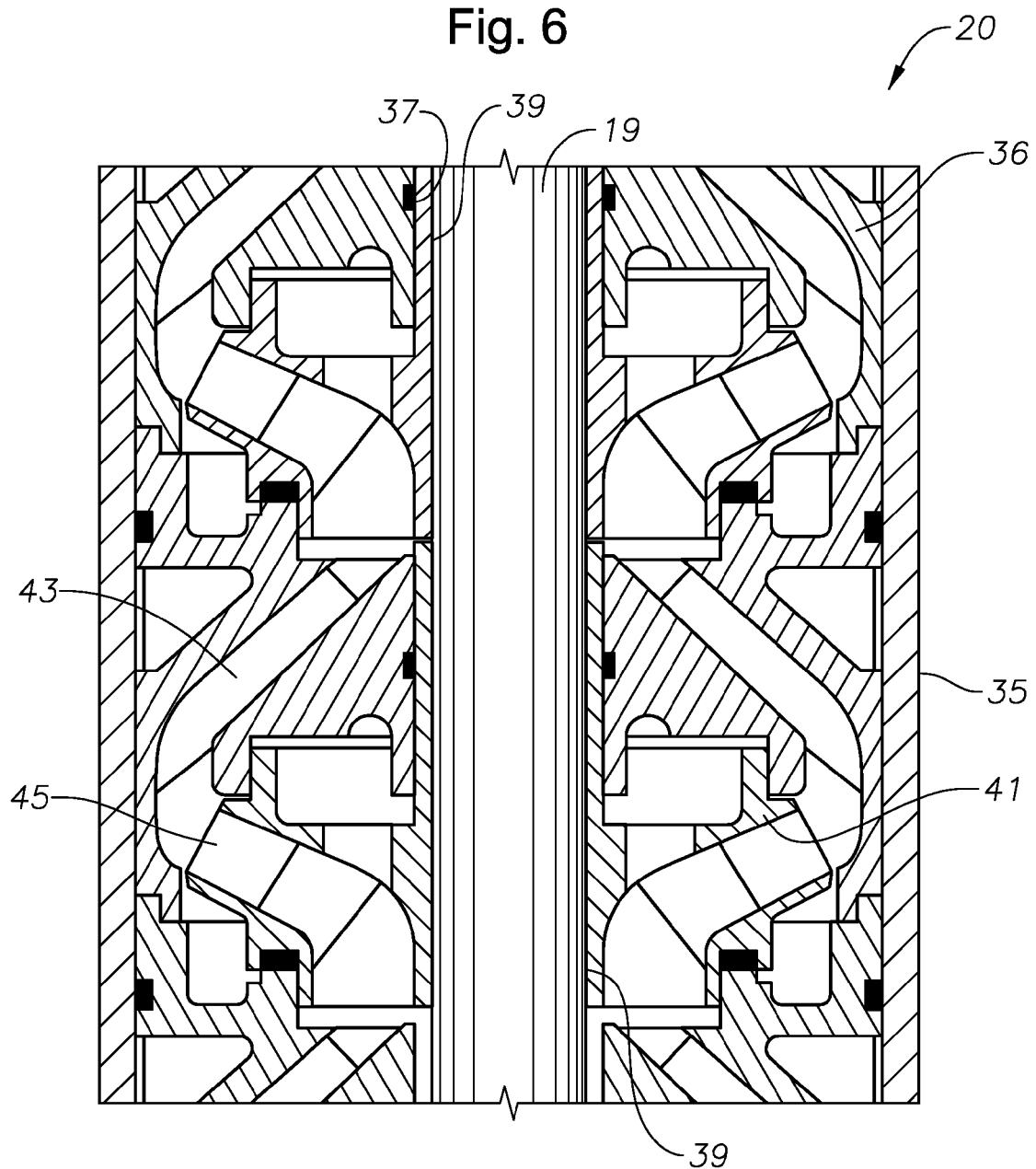

ELECTRICAL SUBMERSIBLE PUMP AND GAS COMPRESSOR

BACKGROUND

1. Field of Invention

The present disclosure relates to a fluid handling system used for producing downhole fluids. More specifically, the present disclosure concerns a fluid handling system having an electrical submersible pump combined with a compressor.

2. Description of Prior Art

Submersible pumping systems are often used in hydrocarbon producing wells for pumping fluids from within the well bore to the surface. These fluids are generally liquids and include produced liquid hydrocarbon as well as water. One type of system used in this application employs an electrical submersible pump (ESP). Typically ESP's employ centrifugal pumps with multiple stages of impellers/diffusers. These systems are particularly used in wells that produce a large amount of water in ratio to the oil. ESPs are typically disposed at the end of a length of production tubing and have an electrically powered motor. Often, electrical power may be supplied to the pump motor via an ESP power cable.

In many oil wells, gas is also produced with the liquid hydrocarbon. The liquid usually comprises hydrocarbon, and water.

In certain applications the pump intake is positioned above where the connate fluid enters the wellbore, and thus gas may enter the inlet. Most ESP's are designed for pumping incompressible liquids and not gas. If too much gas is delivered to a pump it will lose efficiency because of the compressibility of gas. To overcome this problem gas separators are employed to extract gas from the mixture thereby diverting it from the pump inlet. A gas separator separates a mixture of liquid and gas typically by centrifugal force. The liquid flows through a central area into the intake of the pump. The gas is discharged out gas discharge ports into the annulus surrounding the pump. Gas in the annulus collects at the surface of the well and is often introduced through a check valve back into the production flowline at the surface.

The produced gas may be pressurized if it has insufficient pressure to flow to surface or if the gas is to be re-injected into a subterranean formation. Reinjecting the gas may be for promoting hydrocarbon production from that formation, or it may ultimately be delivered to subterranean storage. An example of a centrifugal gas compressor comprises stages of rotating impellers within stators or diffusers. However, the design is such that compressors compress gas and not pump a liquid. Generally, a centrifugal gas compressor must operate at a much higher rotational speed than a liquid pump.

SUMMARY OF INVENTION

The present disclosure includes a fluid production system for delivering wellbore fluids comprising, a gas liquid separator having an inlet configured to receive subterranean wellbore fluid, a gas exit configured to discharge gas from within the fluid from the separator, and a liquid exit configured to discharge liquid within the fluid from the separator. Also included with the system is a pump having an inlet formed to receive liquid from the liquid exit, a compressor having an inlet formed to receive gas from the gas exit, and a motor mechanically coupled to the separator, pump, and compressor, wherein the system is disposed in a conduit.

BRIEF DESCRIPTION OF DRAWINGS

Some of the features and benefits of the present invention having been stated, others will become apparent as the description proceeds when taken in conjunction with the accompanying drawings, in which:

FIG. 6 illustrates in side cross sectional view an embodiment of a pump.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

The present disclosure provides embodiments of a fluid delivery system for use in producing wellbore fluids. More specifically, disclosed herein is a system having a device and method for producing subterranean wellbore fluid. A device is included which is disposable within a conduit, and where the device can accommodate a two phase flow and separately produce the components of a two phase flow. The conduit may be one of a casing or a fluids handling circuit, such as a caisson. The use of the device is also applicable to subsea applications wherein a jumper extends from one wellhead to another wellhead or alternatively a jumper communicates between a wellhead and a manifold. The device disposable in the conduit is modular, self contained, and fully powered within a single unit. The device comprises a gas/liquid separator, a pump for pumping the liquid extracted from the two phase mixture, a compressor for compressing the gas extracted from the two phase mixture, and a motor for driving the separator, pump, and compressor.

Figure 1:
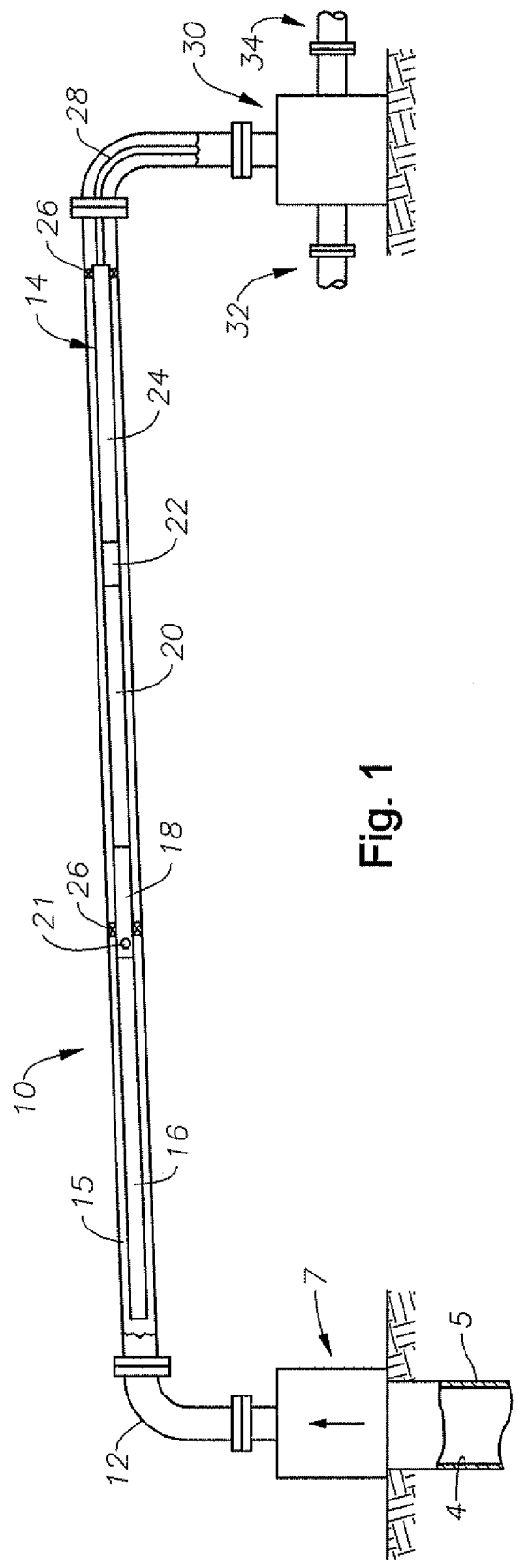
FIG. 1 illustrates a side partial cut-away view of a fluid production system.

FIG. 1 provides a side and partial cross sectional view of a production system 10 for producing wellbore fluids. The production system comprises a production line 12, also referred to herein as a jumper line, a subsea production tree 7 and a manifold 30. The wellhead 7 is in fluid communication with a cased wellbore 5 wherein the cased wellbore (possibly with associated production tubing) delivers production fluids through the wellhead 7. The production fluids may be a two phase mixture of a gas and liquid. The fluid, represented by the arrow, enters the production system 10 through the production line 12 and flows to the fluid delivery system 14. The fluid delivery system 14, shown in side view coaxially disposed within the production line 12, comprises a motor 16, a separator 18, a pump 20, a gear reducer 22, and compressor 24. The flow continues through the production line 12 and when encountering the fluid delivery system 14 flows in the annulus 15 formed between the delivery system 14 and the inner circumference of the production line 12. Flowing past the motor section 16, the flow then enters the inlet 21 of the separator 18.

In the separator 18, as will be described in more detail below, the two phase flow is separated into gas and liquid components. A liquid line is connected to the exit of the separator and supplies liquid to the pump 20. Similarly, a gas line is provided at the gas exit of the separator 18 flow providing inlet gas flow to the compressor 24. Packers 26 may be included in the annulus between the fluid delivery system 14 and the production line 12 inner circumference to ensure the flow is directed into the inlet 21. At the exit of the delivery system 14 a discharge line 28 is shown for directing the individual components of the flow to the associated manifold 30.

Optionally, the gas and liquid may flow in separate tubing (not shown) provided within the discharge line 28. Alternatively either the pressurized liquid or the compressed gas may be directed through the discharge line 28 with the other fluid flowing in the annular space between the discharge line 28 and the production line 12. The manifold 30 is shown having optional features, such as a manifold intake 32 and manifold exit 34. Produced fluids from other wellbores may be combined in the manifold 30 with fluids produced from the wellbore 5. In some instances it may be desirable to inject compressed gas into the wellbore 5, into another wellbore, or into subterranean storage. Accordingly, the discharge pressure of the compressor 24 is adjustable to ensure sufficient pressure for the particular gas injection scenario. Alternatively, however, the manifold exit 34 may direct all fluids to the surface for production.

Figure 2:
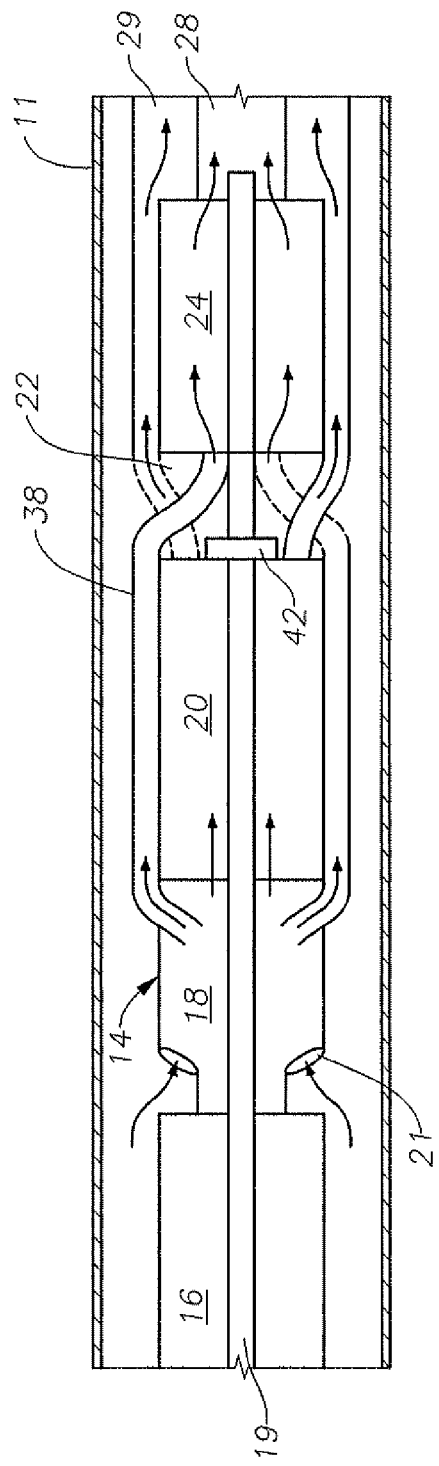
FIG. 2 portrays in partial cut-away side view a fluid delivery system.

Referring now to FIG. 2, a schematic illustration of the fluid delivery system 14 is shown in a side view. In this illustration, the delivery system 14 is coaxially disposed within a conduit 11. The conduit 11 can be either the production line 12 or the casing 4 cemented within the wellbore 5. In the embodiment of FIG. 2, inlets 21 receive two phase fluid (represented by the arrows) therein for delivery to the separator 18. The exit of the separator 18 includes some vapor lines 38, also referred to as bypass lines, that deliver the separated gas to the compressor 24. Schematically illustrated by parallel arrows, liquid flow from the separator is delivered to the pump 20 for pressurizing therein. FIG. 2 shows pump 20 discharging into a liquid flowline 29, which extends alongside compressor 24 and becomes an annulus of discharge line 28. FIG. 2 shows gas discharged from compressors 24 flowing out the inner passage of discharge line 28. A high pressure seal 42 may optionally be provided at the downstream end of pump 20. A shaft 19 is extending from the motor 16 through each of the separator 18, pump 20, and compressor 24. The shaft 19, as will be described later, may be a single unit, or may be comprised of multiple shafts having couplings at the junction of each piece of the rotating equipment that make up the fluid delivery system 14. A gear reducer 22 is provided at the mechanical power intake of the compressor 24. Since most compressors operate at higher RPM's than either a separator or pump, it is necessary to convert a portion of the torque into a higher rotational speed. It is believed that it is within the capabilities of those skilled in the art to produce an appropriate gear reducer to achieve this desired resulting torque and rotational speed. The pump discharge and compressed gas lines may be run separate from one another, optionally these lines may be coaxially piped with one inside of the other.

Figure 3A:
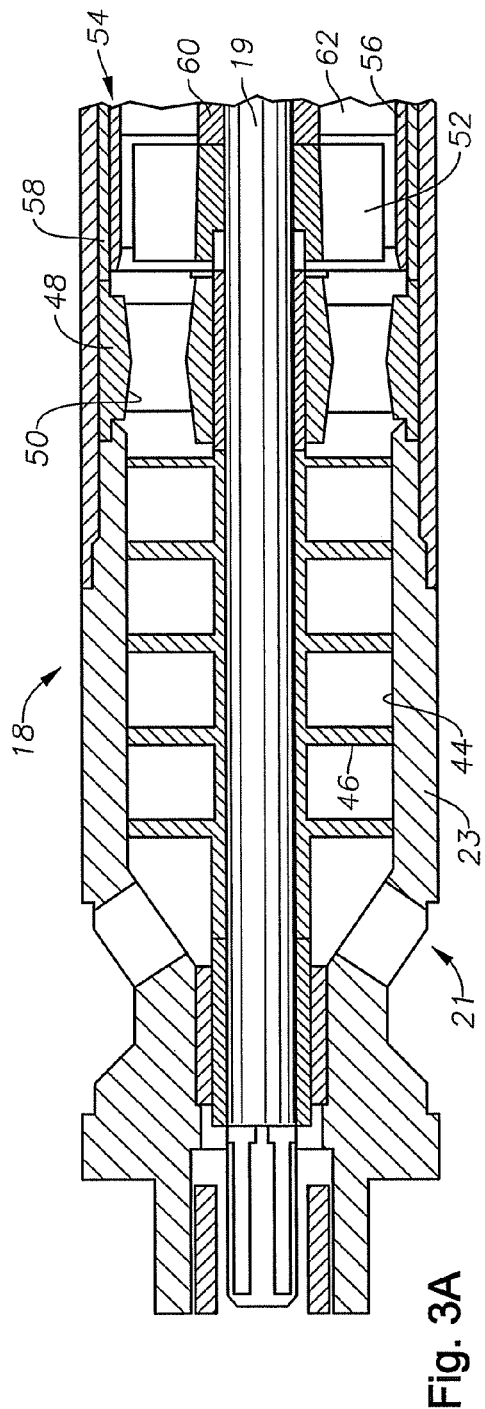
FIGS. 3A and 3B depict in a cross sectional view a portion of the fluid delivery system.
Figure 3B:
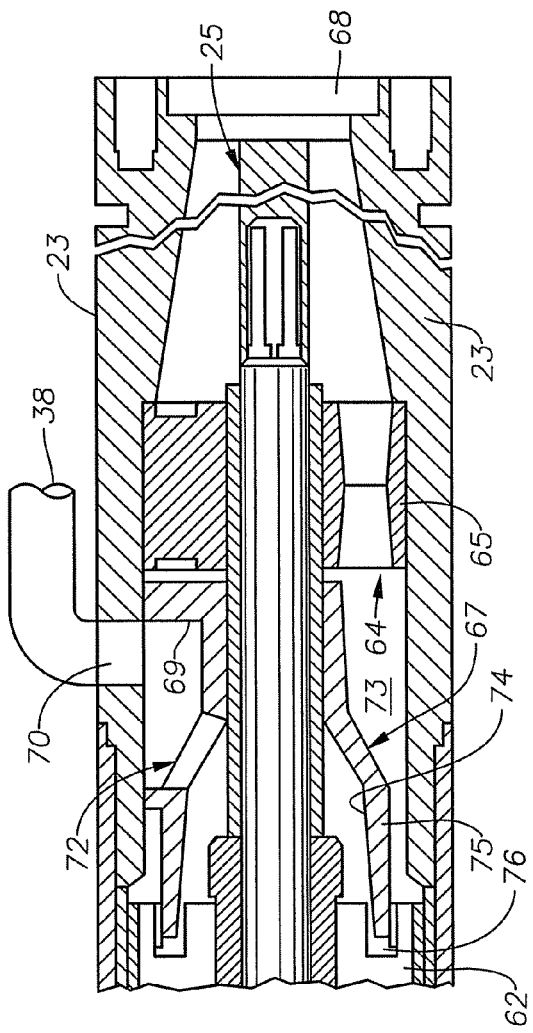

FIGS. 3A and 3B provide a side cross sectional view of one example of the separator 18. A variety of different types of separators could be employed. As shown, the gas separator 18 comprises two or more individual units. Separator 18 comprises a generally cylindrical housing 23 wherein the shaft 19 coaxially extends therethrough. Couplings 25 are provided on opposing ends of the shaft 19 for connection to other rotating machinery within the system 14. An inlet 21 extending through the bottom portion of the housing 23 provides the fluid flow pathway for receiving wellbore fluid.

After passing through the inlet 21 well fluid encounters an inducer 46 that comprises a helical screw mounted to the shaft 19 for rotation therewith. The inducer 46 conveys the fluid upward and pressurizes the fluid to prevent expansion of the gas contained within the fluid at that point. Well fluid then passes through a bearing 48, optionally shown as a spider type bearing, having a plurality of passages 50. Upon leaving the bearing 48, the well fluid is directed to a set of guide vanes 52 that are mounted onto the shaft 19 as well. Preferably, more than one guide vane 52 is provided and each comprises a flat or a curved plate being inclined relative to the shaft axis. The guide vanes 52, when rotating with respect to the fluid, impart a swirling motion to the well fluid directing it to the inner circumference of the housing 23.

The guide vanes 52 are located in the lower portion of a rotor 54 that has an outer cylinder 56 extending down and over the guide vanes 52. The outer cylinder 56 encloses an inner hub 60 and is closely spaced within a stationary sleeve 58 mounted in the passage 44. The inner hub 60 mounts to the shaft 19 for rotation with the shaft. Vanes 62 (only two are shown in the figure) extend between the hub 60 and the outer cylinder 56. Vanes 62 comprise longitudinal blades extending from the lower end to the upper end of the rotor 54. Each vane 62 is located in a plane radial to the axis of the shaft 19, and each vane 62 is vertically oriented.

With reference now to FIG. 3B, the upper portion of the separator is shown. Each vane 62 has a notch 76 on its upper edge. A crossover member 67 mounts stationarily above rotor 54. The crossover member 67 has a depending skirt 75, the lower end of which extends into the notches 76. The skirt 75 defines a gas cavity 74 on its inner diameter. Three gas passages 72 lead through the crossover member 67, each to an upper gas outlet 70 in the sidewall of housing 23. Crossover member 67 has a support 69 that engages the inner diameter of housing 23 and aligns gas passages 72 with gas outlets 70. Liquid passage 73 is located in a clearance between the skirt 75 and the inner diameter of the housing 23. A bearing 65 mounts in housing 23 above the crossover member 67 for supporting the shaft 19. The bearing 65 has one or more axial passages 64 for the flow of the well fluid therethrough. The well fluid flows through a bore outlet 68 on the upper end into the intake of the pump.

In one mode of operation, the well fluid flows in through the intake 21. The inducer 46 applies pressure to the well fluid which then flows through the guide vanes 52 into the rotor 54. The spinning rotor 54 causes some separation of the gas and liquid, with the heavier liquid components moving outward toward the outer cylinder 56.

Referring to FIG. 3B, separated gas flows through the gas cavity 74, the gas passage 72, and exits the gas outlet 70. Upon exiting the gas outlet 70, the gas enters the vapor line 38 for delivery to the compressor. The remaining well fluid flows up the liquid passage 73, through the passage 64, and out the bore outlet 68 to the pump.

Figure 4:
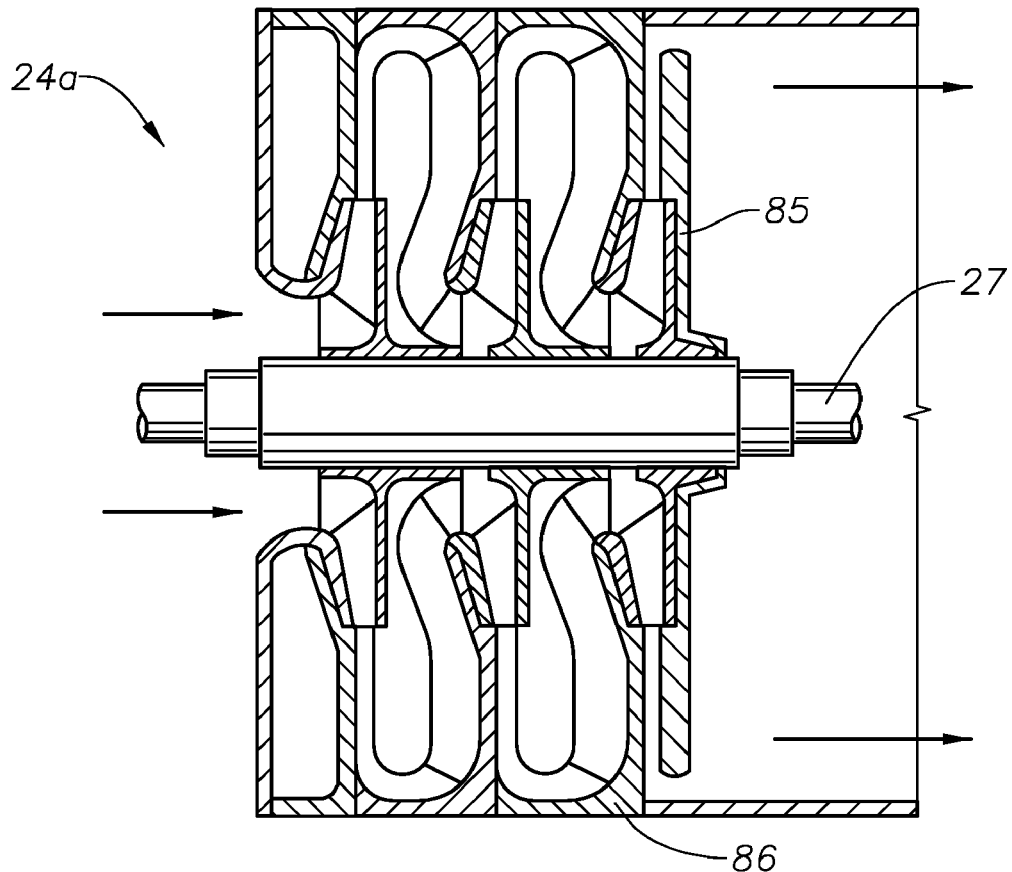
FIGS. 4 and 5 show in cross sectional views embodiments of a compressor.
Figure 5:
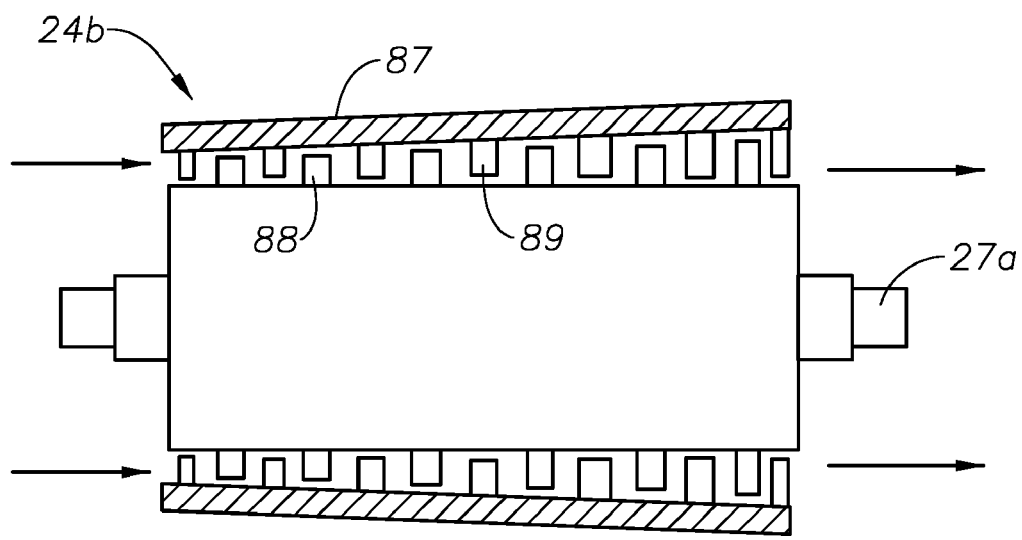

FIGS. 4 and 5 provide in a side cross sectional view examples of a radial flow compressor and an axial flow compressor. With reference now to FIG. 4, it illustrates a radial flow compressor 24a that may be used as the gas compressor 24 of FIG. 1. Typically, a radial flow compressor produces higher pressures but at a lesser flow rate than an axial flow compressor. In this embodiment, the radial flow compressor 24a comprises impellers 85 and configured to rotate relative to corresponding diffusers 86. Impellers 85 are mounted on a shaft 27. The configuration is such that the flow has a radial outward and inward components from each successive stage.

FIG. 5, which illustrates an embodiment of an axial flow compressor 24b, provides flow in a generally axial direction with minimal outward/inward radial components. The axial compressor 24b comprises a tubular housing 87 with a large number of impellers 88. The impellers 88 are rotated within corresponding stators 89, which provides a function similar to that of corresponding diffusers. A corresponding shaft 27a rotates the impellers 88 within the corresponding stators/diffusers. Each stage of an impeller 88 and stator 89 results in a pressure increase.

With reference now to FIG. 6, a side cross sectional view of one example of a centrifugal pump is shown. The centrifugal pump 20 comprises a housing 35 for protecting the components of the pump 20. The pump 20 comprises a shaft 19 extending longitudinally through the pump 20. Diffusers 36 comprise an inner portion with a bore 37 which through a shaft 19 extends. Each diffuser 36 comprises multiple passages 43 that extend through the diffuser 36. An impeller 41 is placed within each diffuser 36. The impeller 41 includes a bore 39 that extends to the length of the impeller 41 for rotation relative to a corresponding diffuser 36 and is engaged with the shaft 19. Optionally, thrust washers may be included and placed between the upper and lower portions of the impeller 41 and the diffuser 36.

In operation, the impellers 41 rotate along with the shaft 19 which increases the velocity of the fluid being pumped as the fluid is discharged radially outward through passages 45. The fluid intake flows inward through the diffuser passages 43 and returns to the intake of the next stage impeller 41, which decreases the velocity and increases the pressure of the pumped fluid. Increasing the number of stages by adding more impellers 41 and diffusers 36 can increase the fluid pressure at the exit of the pump.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

The invention claimed is:

1. A method of producing a two phase gas liquid mixture of wellbore fluid, the method comprising:
   connecting a motor into an assembly along with a rotary gas separator, a gas compressor and a pump, and placing the assembly within a conduit, the assembly having a longitudinal axis with the pump being located axially between the gas separator and the compressor;
   operating the motor to drive the gas separator, the gas compressor and the pump, and communicating a two phase gas liquid mixture of wellbore fluid in the conduit to the gas separator, and with the as separator, separating the gas and liquid mixture into a substantially monophase gas component and a substantially mono-phase liquid component;
   flowing the liquid component from the gas separator to the pump and pumping the liquid component into a liquid flow passage;
   without releasing the gas component into the conduit, flowing the gas component from the gas separator past the pump to the compressor, compressing the as component and delivering the gas component into a gas flow passage, which is separate from the liquid flow passage; and
   wherein flowing the liquid, component from the pump into the liquid flow passage comprises flowing the liquid component through a liquid component bypass line alongside and past the compressor to avoid communicating the liquid component to the conduit.

2. The method of claim 1, wherein flowing the gas component from the gas separator to the gas compressor comprises flowing the gas component through a gas component bypass line alongside and past the pump, thereby isolating the gas component in the bypass line from communication with the conduit.

3. The method of claim 1 wherein the liquid component flows in the liquid flow passage in the same direction as the gas flows in the gas flow passage.

4. The method of claim 1, wherein the liquid flow passage and the gas flow passage are concentric with each other, with one of the flow passages comprising an annulus surrounding the other flow passage.

5. The method of claim 1, wherein connecting the motor into the assembly comprises mounting the motor to an inlet end of the gas separator.

6. The method of claim 1, wherein placing the assembly in a conduit comprises placing the assembly within a subsea flowline jumper.

7. A fluid production system for delivering wellbore fluids comprising:
   a subsea flowline jumper having an in adapted to receive wellbore fluid from a subsea well and an outlet for connection to a subsea manifold for delivery of the wellbore fluid to a surface platform;
   a gas liquid separator located within the jumper and having an inlet configured to receive the wellbore fluid flowing into the inlet of the jumper, a gas exit configured to discharge gas from within the fluid from the separator, and a liquid exit configured to discharge liquid within the fluid from the separator,
   a pump located within the jumper and having an inlet formed to receive liquid from the liquid exit, the pump having an inlet end mounted to the separator;
   a compressor located within the jumper and having an inlet formed to receive gas from the gas exit;
   a gas outlet conduit connected to an outlet of the compressor for delivering gas compressed by the compressor to the subsea manifold;
   a motor mechanically coupled within the jumper in an assembly with the separator, pump, and compressor for rotating the separator, the pump and the compressor, the assembly having a longitudinal axis, with the pump being located axially between the separator and the compressor;
   gas bypass line leading from the gas exit of the separator past the pump to the inlet of the compressor, and wherein the pump has an outlet that discharges liquid within the jumper, which flows around the compressor to the outlet of the jumper.

8. The fluid production system of claim 7, wherein:
   the motor is mounted to an inlet end of the gas separator; and wherein the system further comprises:
   a speed/torque converter mechanically coupled between the pump and the compressor for rotating, the compressor faster than the pump.

9. The fluid production system of claim 7 wherein the gas outlet conduit is at least partially located concentrically within the jumper.

10. The fluid production system of claim 7 wherein the gas outlet conduit is concentrically mounted in the jumper, defining an annulus through which the liquid from the outlet of the pump flows.

11. A system for delivering wellbore fluids, comprising:
an electrical motor;
a rotary gas liquid separator mounted to the motor, the separator having a wellbore fluid inlet, a gas component exit, and a liquid component exit;
a centrifugal pump driven by the motor, mounted to an exit end of the separator and having a liquid component inlet in fluid communication with the separator liquid component exit;
a rotary compressor assembly driven by the motor, having an inlet end mounted to an outlet end of the pump, having a gas component inlet and a gas component outlet for connection to a gas flow line;
a liquid component bypass line extending from an outlet of the pump past the compressor assembly for connection to a liquid flow line; and
a gas component bypass line extending from the separator gas component exit past the pump to the gas component inlet of the compressor assembly.

12. The system of claim 11 further comprising:
a concentric flow line extending from the compressor assembly, having an inner flow passage and an annular flow passage; and
wherein the liquid flow line comprises one of the flow passages and the gas flow line comprises the other of the flow passages.

13. The system of claim 11, wherein the compressor assembly further comprises a speed/torque converter, the converter configured to increase a rotational speed of the compressor over a rotational speed of the pump.

* * * * *

UNITED STATES PATENT AND TRADEMARK OFFICE
CERTIFICATE OF CORRECTION

| | | |
|---|---|---|
| PATENT NO. | : 8,066,077 B2 | Page 1 of 1 |
| APPLICATION NO. | : 11/957912 | |
| DATED | : November 29, 2011 | |
| INVENTOR(S) | : Peter Francis Lawson | |

It is certified that error appears in the above-identified patent and that said Letters Patent is hereby corrected as shown below:

IN THE CLAIMS:

Column 8, line 9, delete "inner" and insert --inlet--

Signed and Sealed this
Tenth Day of April, 2012

David J. Kappos
*Director of the United States Patent and Trademark Office*